United States Patent [19]

Andrews, Jr. et al.

[11] Patent Number: 5,560,767

[45] Date of Patent: *Oct. 1, 1996

[54] METHOD FOR FORMING, COLLECTING AND UTILIZING WOOD-WASTE PRODUCTS

[75] Inventors: William S. Andrews, Jr., Durham; William S. Andrews, III, Creedmoor, both of N.C.

[73] Assignee: B & B Organic Composite and Soils, Inc., Durham, N.C.

[*] Notice: The term of this patent shall not extend beyond the expiration date of Pat. No. 5,435,819.

[21] Appl. No.: 471,577

[22] Filed: Jun. 6, 1995

Related U.S. Application Data

[63] Continuation-in-part of Ser. No. 223,839, Apr. 6, 1994, Pat. No. 5,435,819, which is a continuation of Ser. No. 944,889, Sep. 14, 1992, abandoned, which is a continuation-in-part of Ser. No. 813,364, Dec. 24, 1991, abandoned.

[51] Int. Cl.$^6$ ..................................................... C05F 9/00
[52] U.S. Cl. ..................... 71/6; 71/23; 71/903; 405/128; 405/129
[58] Field of Search .................................. 71/6, 23, 903, 71/9, 11, 13, 21, 23, 904; 405/128, 129; 435/287, 290.1; 422/184

[56] References Cited

U.S. PATENT DOCUMENTS

| | | | |
|---|---|---|---|
| 3,719,314 | 3/1973 | Cox | 225/97 |
| 4,050,917 | 9/1977 | Varro | 71/9 |
| 4,146,382 | 3/1979 | Willisch | 71/9 |
| 4,326,874 | 4/1982 | Burklin | 71/9 |
| 4,420,320 | 12/1983 | Hartmann et al. | 71/13 |
| 4,608,126 | 8/1986 | Watson et al. | 202/84 |
| 5,192,354 | 3/1993 | Drysdale et al. | 71/9 |
| 5,435,819 | 7/1995 | Andrews, Jr. et al. | 71/6 |

OTHER PUBLICATIONS

*National Geographic* May, 1991 article entitled "Once and Future Landfills", pp. 117–134.

Extract from book entitled "Rubbish, The Archeology Of Garbage" by Rathie, Jul. 1992, pp. 110–123, 130, 238–250.

*Primary Examiner*—Ferris Lander
*Attorney, Agent, or Firm*—Olive & Olive, P.A.

[57] ABSTRACT

A method is provided wherein wood-wastes in the form of stumps, limbs, branches, whole trees and the like are formed in a loose pile on a substantially flat site as a filled landfill or abandoned surface mine. The file is allowed to disintegrate until portions are of a crumbly texture at which stage large whole pieces in the pile are separated from the crumbly texture material which then becomes a useful wood-waste product and groundcover at the site at which the separation takes place. Deep-rooted plants are permitted to grow on the pile accelerate the disintegration.

6 Claims, 5 Drawing Sheets

LOCATING A WASTE TREATMENT SITE HAVING A RELATIVELY LARGE SUBSTANTIALLY FLAT AREA IN NEED OF GROUNDCOVER

↓

DEPOSITING LOADS OF WOOD-WASTES ON THE SUBSTANTIALLY FLAT WASTE TREATMENT SITE AREA IN NEED OF GROUNDCOVER BY DROPPING THE LOADS AT THE SITE TO FORM A LOOSE MOUND SPREAD OVER THE RELATIVELY LARGE SUBSTANTIALLY FLAT AREA, SHAPED ON ITS TOP SURFACE TO MINIMIZE WATER COLLECTION AND OF SUFFICIENT HEIGHT TO ASSURE THAT AN INNER LOWER PORTION OF THE MOUND TENDS TO REMAIN DRY

↓

DETERMINING WHETHER THE MOUND CONTAINS A PREDETERMINED AMOUNT OF SOIL

↓

ADDING SOIL IF THE MOUND DOES NOT CONTAIN THE PREDETERMINED AMOUNT

↓

ALLOWING VEGETATION PREFERABLY DEEP-ROOTED TO GROW ON THE MOUND

↓

ALLOWING THE MOUND TO REMAIN UNDISTURBED FOR AN EXTENDED PERIOD WITHIN THE RANGE OF ONE-HALF TO FIVE YEARS

↓

PERIODICALLY SAMPLING A SELECTED PART OF THE MOUND TO DETERMINE THE PRESENCE OF WOOD-WASTES HAVING A CRUMBLY TEXTURE

↓

SEPARATING THE WOOD-WASTES HAVING CRUMBLY TEXTURE FROM OTHER WOOD-WASTES IN THE MOUND

↓

UTILIZING THE SEPARATED-OUT CRUMBLY WOOD-WASTES AS GROUNDCOVER FOR THE RELATIVELY LARGE SUBSTANTIALLY FLAT AREA AT THE SITE

FIG. 8

METHOD FOR FORMING, COLLECTING AND UTILIZING WOOD-WASTE PRODUCTS

CROSS-REFERENCE TO RELATED APPLICATIONS

This application is a continuation-in-part of U.S. patent application Ser. No. 08/223,839 filed, Apr. 6, 1994, now U.S. Pat. No. 5,435,819 and which is a file wrapper continuation of U.S. patent application Ser. No. 07/944,889, filed Sep. 14, 1992, now abandoned, the said '889 patent application being a continuation-in-part of U.S. patent application Ser. No. 07/813,364, filed Dec. 24, 1991, now abandoned.

BACKGROUND OF THE INVENTION

1. Field of Invention

The present invention relates to an improved method for forming a wood-waste product from wood-wastes such as stumps and limbs, and to collecting and utilizing such product for use as a soil, a soil additive or the like.

2. Description of the Related Art

The most relevant prior art is believed to be embodied in the File History of the referred to U.S. patent application Ser. No. 08/223,839, now U.S. Pat. No. 5,435,819, the contents of which are deemed incorporated herein by reference. In other aspects of the prior art, the patent of Hartmann et al. (U.S. Pat. No. 4,420,320) provides a method for producing soil conditioners from waste material, such as refuse and sludge. Briquettes of the material are subjected to intense rotting to reduce the water content, and then the briquettes are ground and screened. The smaller particles are used as a soil conditioner and the larger ones are treated by low temperature carbonization or combustion.

Composting methods are often used to treat wastes containing plant matter. Composting results in extreme heating of the material being composted, requires the presence of a significant amount of moisture, and results in a humus-like final product. For example, the composting process of Willisch (U.S. Pat. No. 4,146,382) comprises grinding waste material to bring it to a predetermined size, and then bedding the material in successive self-aerating stacks having a honeycomb tunnel ventilation system, which is actively aerated. The resultant material may be used for compost.

City wastes, which are high in paper content, may be treated by being ground into small pieces, screened, and placed in a digester in layers that are turned over periodically with plowshares and are watered and held to retain a high temperature for the decomposition to proceed (U.S. Pat. No. 4,050,917).

In some instances, trees and limbs are broken into short sections for burying (U.S. Pat. No. 3,719,314).

Silvicultural wastes and other arboreal wastes are produced in substantial volume when land is cleared for highways, agriculture, and construction of buildings and other structures. The stumps, limbs, branches, tree trunks and whole trees comprising the wood-wastes produced are typically either placed in a landfill, dumped into a deep hole and covered, bulldozed and packed into a relatively tight pile on an unused piece of land, ground into chips and scattered, or burned. It was not known before applicants' prior invention as set forth in applicants' U.S. Pat. No. 5,435,819 to provide a method for forming such wood-wastes into a useful product and particularly in a manner not requiring that the wood-wastes be ground, broken, burned, periodically turned, composted, aerated or chemically treated.

Local and state governments have enacted rules to control how and where persons may dispose of such wood-waste materials. For example, the North Carolina Administrative Code currently provides that "demolition landfills", which are defined as landfills that are limited to receiving stumps, limbs, leaves, concrete, brick, wood, uncontaminated earth or other approved solid wastes, must have the waste placed therein restricted to the smallest area feasible, and must meet other requirements.

The North Carolina Administrative Code further defines "yard wastes", as being limited to stumps, limbs, leaves, grass and untreated wood, and specifies treatment by composting of the wastes. In such facilities, the particle size of the larger trash items such as limbs, trees, and stumps is required by law to be reduced to promote composting. The compost must also be aerated, such as by turning, elevated temperatures must be maintained, and nitrogen bearing waste such as grass clippings must be incorporated to aid in the microbial composting process.

Thus, the primary ways of disposing of wood-containing wastes, either do not utilize large waste pieces, do not result in a usable product, and/or require covering with top soil, grinding, burying, composting, heat generation, addition of water, aerating, turning or substantial labor.

The prior invention described in U.S. Pat. No. 5,435,819 in contrast to the prior art provides a method for converting such wood-wastes into a useable product in a manner which does not require grinding, composting, heat generation, addition of water or chemicals, aerating, turning, burning or burying.

It is therefore a general object of the present invention to provide an improved method for forming wood-containing wastes into a useful wood-waste product and once formed, a method for collecting such wood-waste product for transfer to a useful application.

A further and more specific object of the present invention is to provide an improved method for forming wood-containing wastes into a useful product and once formed, a method for collecting such wood-waste product in a manner which does not require or involve grinding, the addition of water or chemicals, heat generation, composting, aeration, breaking, burning or burying.

Another object of the present invention is to provide a method for forming wood-containing wastes into a wood-waste product which may be used as soil to grow plants at the same location at which the wood-waste product was formed.

A further object of the present invention is to provide an improved means for enhancing drying of the wood-waste pile during forming of the wood-waste product of the invention.

Other objects and advantages will be more fully apparent from the following disclosure and appended claims.

SUMMARY OF THE INVENTION

The present invention in one aspect utilizes the described method of the prior invention for forming wood-wastes into a useful plant growth product and more specifically is directed to using the method of the prior invention in a manner which enables the product to be both formed and used at the same location. More particularly, the present invention is directed to an improved method for forming and collecting such product for subsequent use at the site where the product is formed. When the wood content of the wood-waste product becomes dry and crumbly, the dry and crumbly wood-wastes are permitted to accumulate at the site for use as a soil and to be separated from the larger wood-wastes. In another aspect of the present invention, the wood-wastes are accumulated over very large areas rather than in windrows as illustrated in the prior pending patent application. In a further aspect, deep rooted vegetation is employed to enhance removal of moisture from the mound to accelerate degradation of the wood-wastes.

Other aspects and features of the invention will be more fully apparent from the following disclosure and appended claims.

DETAILED DESCRIPTION OF THE INVENTION AND PREFERRED EMBODIMENTS THEREOF

Since the present invention represents an improvement over the prior invention, reference will first be made to describing the prior invention.

Figure 1:
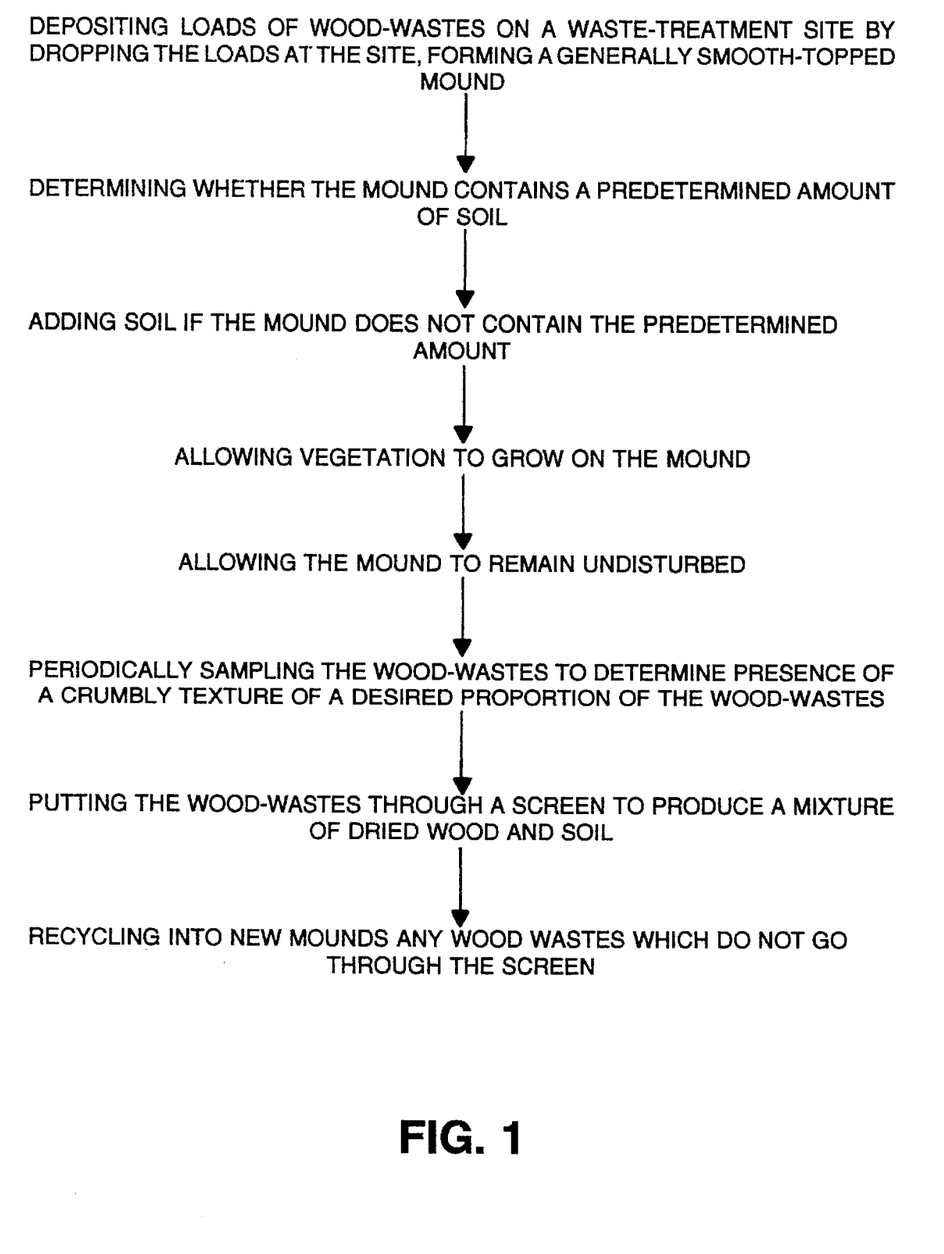
FIG. 1 is a schematic diagram of the method of the prior invention of patent application Ser. No. 08/223,839, now U.S. Pat. No. 5,435,819.

Making reference initially to FIG. 1, the dry method of the prior invention described in the prior U.S. patent application Ser. No. 08/223,839, now U.S. Pat. No. 5,435,819, for disintegrating relatively large, unbroken, unground wood-wastes such as stumps, limbs, branches, tree trunks, and whole trees and which operates in ambient temperature comprises:

(a) providing unbroken, unground wood-wastes having at least some associated soil;

(b) providing a waste-treatment site;

(c) depositing loads of said unbroken, unground wood-wastes on said waste-treatment site by dropping the loads including any soil associated therewith at the site to loosely pile said wood-wastes and form an uncovered mound of sufficient height to permit a lower internal portion of said mound to remain substantially dry in the presence of rainfall at the site and shaped to facilitate vegetation growth and avoid rainfall water collection thereon;

(d) enhancing the said dry method of disintegrating by allowing vegetation growth to permeate the uncovered surface of the mound to form a vegetation mass thereon;

(e) insuring that said unbroken, unground wood-wastes within said mound remain undisturbed and unturned for a period within a range of six months to five years without artificial aeration, without the addition of heat, without chemical treatment, in a condition which does not generate heat within the mound and without movement or breaking of the; wood-wastes forming the mound until portions of the wood-wastes in the mound are of a desired dry and crumbly texture;

(f) periodically sampling the wood-wastes in the mound to determine when portions of wood in the wood-wastes in the mound are of a desired dry and crumbly texture; and (g) when a desired dry and crumbly texture is determined to be present, separating the waste in said mound to form a collection of large unbroken pieces and a collection of granular material forming a non-composted wood-waste product containing dry wood particles and soil particles making up at least a portion of said wood-waste product.

To complete the above description, it may be mentioned that no water is added to the mounds except for natural rainfall; however, in particularly dry areas water may optionally be added to enable the vegetation to grow on the mounds.

As used in reference to both the prior and present invention, the term "wood-wastes" means at least one of the following: stumps, limbs, branches, tree trunks, and whole trees. Although the preferred embodiments of both the prior art and the present invention utilize primarily the above-listed wood-wastes, wood chips, leaves, and other organic, and preferably cellulosic, material, may be added to greater quantities of wood-wastes. Preferably, the amount of wood chips used is minimal because of the acidity of the wood chips. Other cellulosic, plant derived wastes may be used in addition to or instead of wastes obtained from trees, and are included in the term "wood-wastes" in the broad practice of both the prior and present invention.

Figure 2:
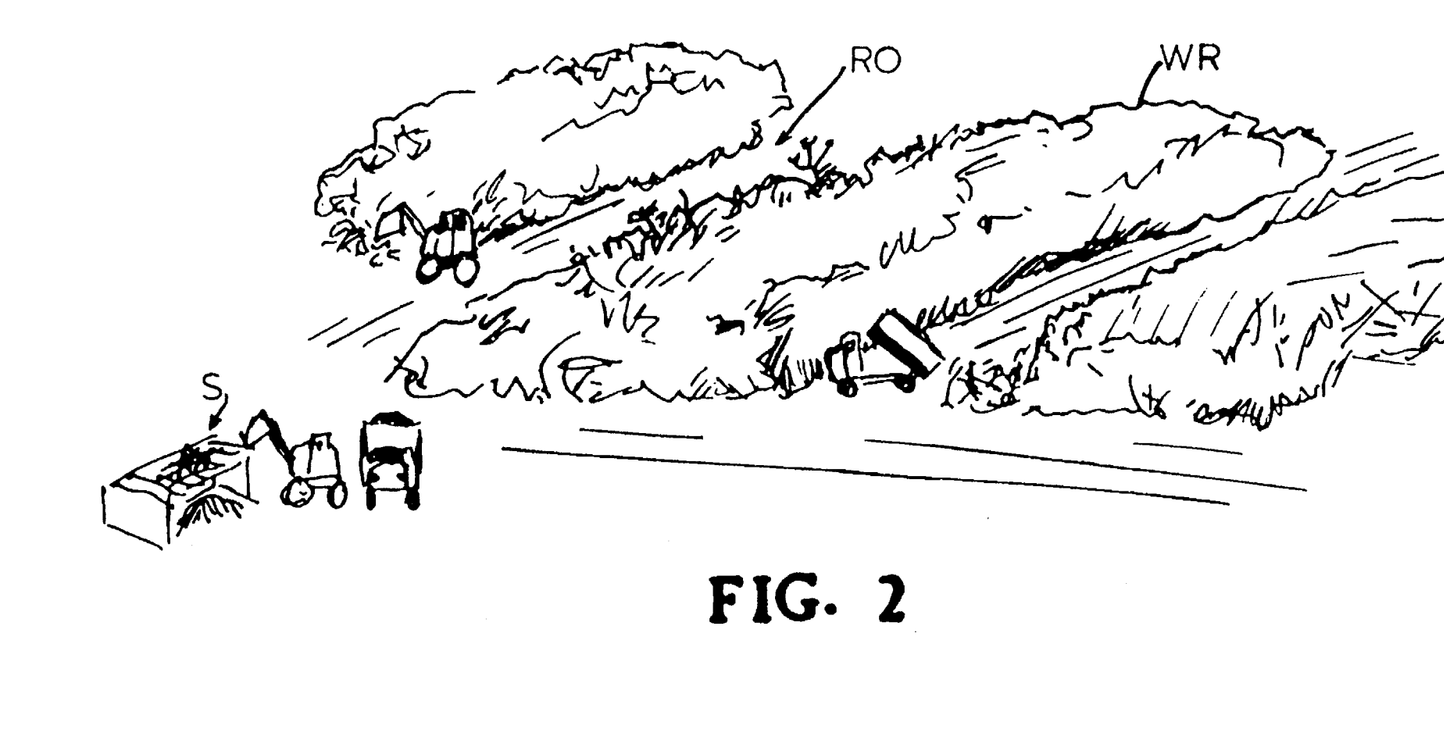
FIG. 2 is a perspective view of a plurality of mounds formed according to the prior invention.
Figure 3:
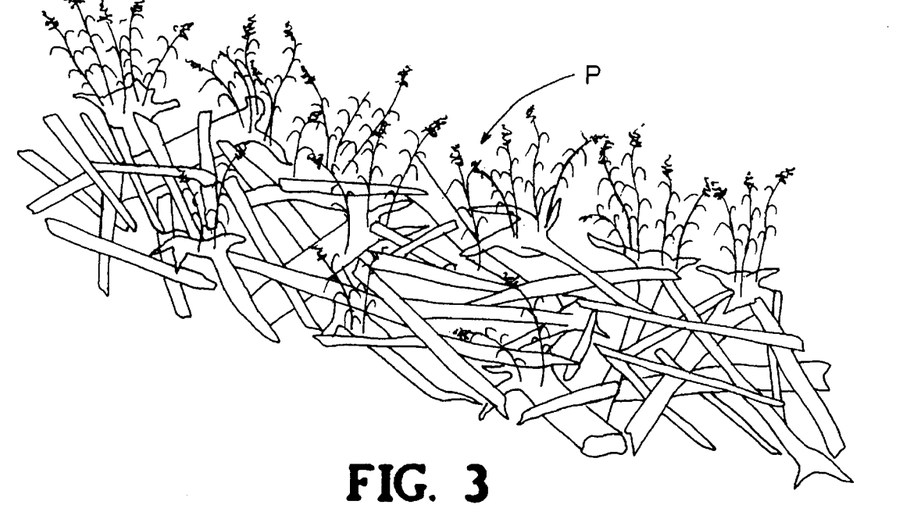
FIG. 3 is a perspective view of a portion of a loosely formed large mound formed according to the present invention.

The wood-wastes are preferably taken from sites having uprooted tree trunks having dirt on them, trees, branches, brush and other wood debris, and are loaded into trucks and then dumped on top of or next to previous loads to form a loose pile as in FIGS. 2 and 3. The wood-wastes are not ground prior to placing them in the mounds, which would otherwise tend to create an anaerobic mound of small pieces of wood. Rather, the wood-wastes, preferably containing large stumps and other large pieces of wood, and dirt, are dumped on the ground and then loosely piled into mounds and allowed to remain there without disturbance. Large wood pieces thus are not removed from the waste.

The cumulative loads form a large mound, which is preferably about 10–12 feet high. One advantage of having a great depth to the mound is that when it rains, the water usually does not go all of the way into the mound, with the result that the lower portions remain dry. Thus, the method of the invention does not result in leaching. Another advantage of having high mounds is that more waste can be placed at a site.

The mound as described in reference to the prior invention is preferably in the form of a long windrow WR (FIG. 2), which may be, for example, about 80–300 feet long and about 80 feet wide, or any other dimension suitable for the waste-treatment site. Thus, for example, about 800 loads of 10 cubic yards each may be placed in a windrow. The actual size of the mound, however, does not matter so long as it allows most of the material in the mound to dry. Preferably the top of the mound is essentially flat or generally flat, and does not form valleys for water to gather in nor peaks upon which it is difficult to grow plants. Roads RO (FIG. 2) between the windrows are about 30 feet wide to allow maneuvering of machinery when employed to add loads to the mound, and later, to remove loads for screening.

In the preferred embodiment of both the prior and present invention, no chemicals, fertilizers or liquids are added to the mounds, because such additions are not necessary to the practice of either the present or the prior invention. Also, it is clear that such additions may in fact be harmful to the environment, and depending on the chemical could interfere with the use of the final product.

It is critical to both the present and the prior invention that soil or sand be present in and/or on the mounds. This soil or sand preferably comes from the roots of the trees, or may be added to the mound during formation of the mound. If not already present, the preferred additive is sand, which tends not to retain water, but easily allows water to drain through it and when used is added at a volume of about 5–15% of the volume of the mound during mound formation.

In the prior invention, growing plants or seeds are optionally placed on the mound so that plants begin to grow on top of the mound. This same process happens a bit more slowly if no seeding is done by the operator, but it does occur, so that a significant vegetation mass forms on top of the mound.

Continuing with a description of the prior invention, the mound is allowed to sit unattended without further treatment for a period of anywhere from about 6 months to about 2 to 5 years. Generally, even relatively large logs reach a crumbly stage after 2–3 years in a mound prepared according to the invention. During this period, the mound does not heat up as in composting, nor is heat required or used to form the product of the invention. Thus, unlike a compost pile, these mounds when disturbed show no evidence of heat or fermentation. As further evidence of the difference between the two processes, the pH of the final product formed according to the invention herein is not acid, but rather is generally about 6.25 to 6.40.

The mounds are inspected periodically by removing a load or a portion of a load to determine whether the chunks of wood in the mound are dry and flake or crumble apart when handled. In the present invention as later described, a shaking screen is not necessarily employed. However, in the prior invention, any time after a desired portion of the wood in the mound has reached this crumbly state, which may be for example, when 50% or more of the chunks of wood have reached this stage, the crumbly wood is separated out by means of dumping loads of the wood-waste onto a shaking screen S (FIG. 2). Preferably the screen used is a screen such as the Read Screen-All (Read Corporation, Middleboro, Mass.), with a preferable mesh size of 2¼ inch for the top screen and 1-inch for the lower screen; however different size screens may be used for different textures of final product. Successive loads of wood-waste from the mound are dumped on the screen. Pieces too large to fit through the screen fall off the screen away from the mound of screened material.

The large pieces of wood remaining after the screening in the practice of the prior invention and which were not broken apart into small pieces during the screening process, are placed into new mounds which are treated in the same way as the initial mounds to recycle the larger pieces through another drying sequence. Herbaceous plants and bushes which have grown on top of the initially harvested mounds may be moved to the new mounds and allowed to take root. Alternatively, or in addition, the new mounds may be seeded or allowed to seed naturally.

The method of both the prior and present invention generally yields about 50%–90% of the number of loads of soil product as were used of wood-waste, primarily because of the great amount of air space in the mounds. If leaves are used, a lower volume of soil results, generally about 30% of the original volume.

If the mounds which formed the final product were essentially all plant material, and absolutely no soil, or very little soil is present on or within the material placed in the mounds, sand may be added to the dry wood-waste final product.

The texture and quality of the final product are similar to high quality soil. The final product contains the actual soil which was in the mound plus finely textured dry wood particles. The final wood-soil mixture may be used for topsoil, high quality organic soil, potting soil, garden beds, or as an additive to soil products containing other organic matter, sand, sawdust, cotton yarn waste, bark fines, sludge, etc. so long as the material is not contaminated in a manner to make it undesirable for use in a soil product.

Continued experience with the prior invention has led to the realization that landfills that have been covered over after being filled and abandoned surface mines typically require a soil cover before being converted to other uses and that a modification of the prior invention offers an opportunity to meet this need. The description next describes the present invention in reference to the prior invention.

With the detailed explanation of the prior invention in mind, FIG. 3, in relation to the method of the present invention, illustrates a portion of a mound of wood-wastes which rather than being loosely piled in a windrow as illustrated in the prior invention, is loosely piled over an area forming a part of an extremely large area, not shown, which is preferably substantially flat and which might, for example, be as much as 1000 feet square or one acre or more in size. The character of the pile is nevertheless the same as in the prior invention in that the wood-wastes are dropped in place so that the pile itself is loose, is of a height preferably in the range of 10–12 feet high and is formed insofar as practical to avoid collection of water and to promote vegetation on the top of the pile. In the present invention, the new wood-wastes are preferably added to one side of the pile and the degraded wood-wastes are removed from an opposite or another side of the pile.

Figure 4:
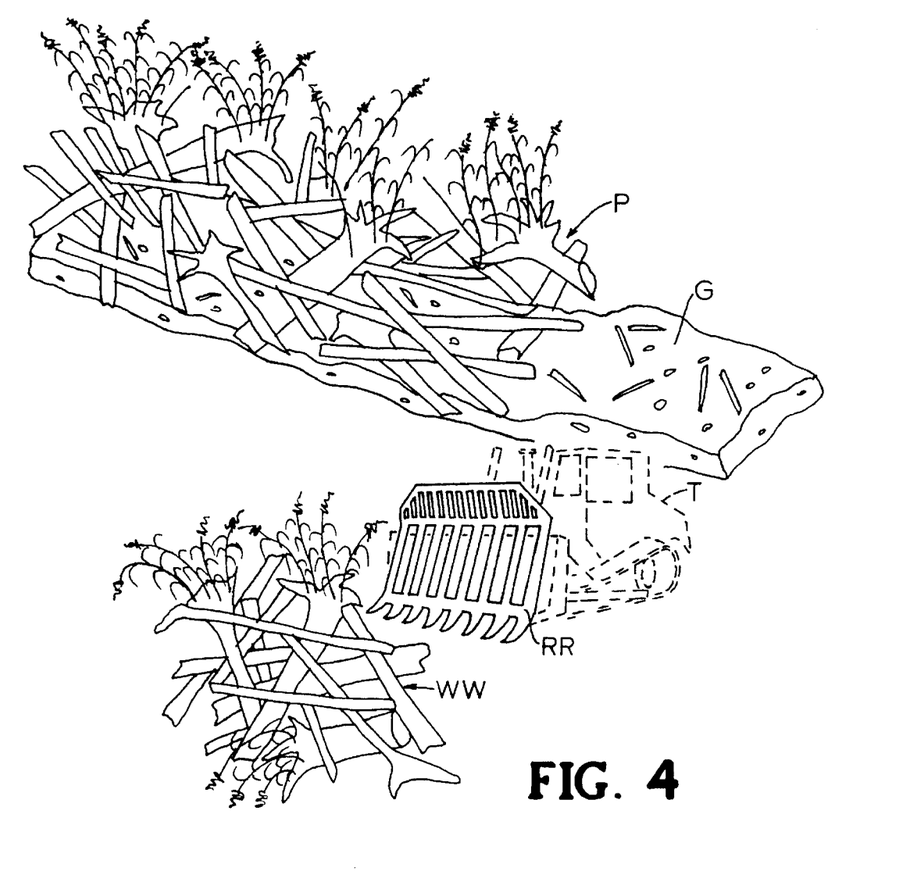
FIG. 4 is a perspective view illustrating use of a root rake to separate the wood-wastes on site according to the present invention.
Figure 5:
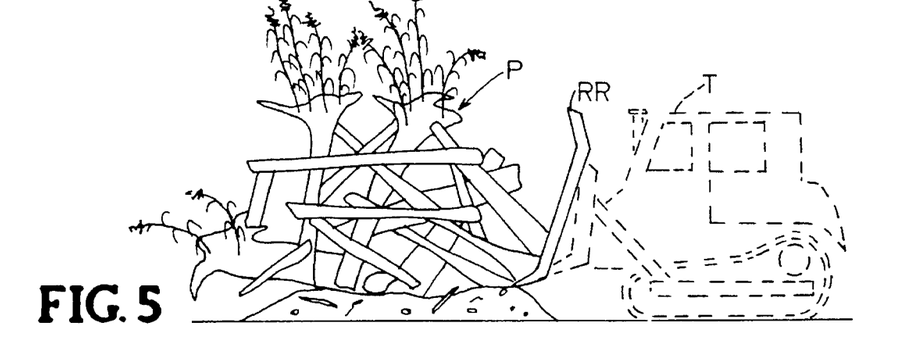
FIG. 5 is a side view of a root rake attacking a pile of degraded wood-waste.
Figure 6:
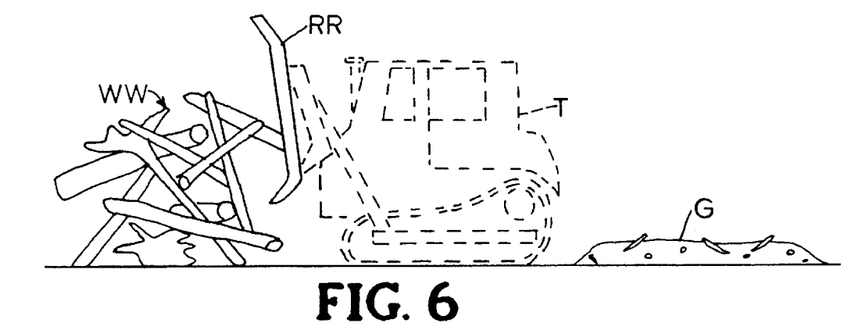
FIG. 6 is a side view of a new mound being formed at a second site from partially degraded wood-waste removed from a first site by the separated-out wood-waste.

In another aspect of the present invention, the wood-wastes are initially loosely piled in the manner previously explained over a large substantially flat area such as over a filled landfill or over an abandoned surface mine in need of groundcover. In this example, after a substantial portion of the wood-wastes in the oldest part of the pile have assumed a crumbly texture, a tractor T equipped with a root rake, as shown in FIG. 4, is used to push away from the pile P the large undegraded pieces of wood-waste WW and to leave in-situ the degraded wood-wastes as groundcover G for the particular area whether a landfill, surface mine or other area in need of groundcover. It has been found desirable to first use a relatively course tooth rake, e.g. 8-inch to 10-inch tooth spacing, and follow this with a relatively fine tooth rake, e.g. 3-inch to 4-inch tooth spacing.

What has become particularly apparent is that the wood-waste product formed by the separated-out wood-wastes typically has at least some soil and once exposed to the weather immediately supports vegetation and which vegetation can be enhanced by sowing grass or other seeds. In this same example, the present invention permits the large wood-wastes pushed away by the root rake RR from the older side of the pile to be picked up by a front-end loader, such as shown in FIG. 2, and dumped on the most recently formed side of the same pile from which it was removed or dumped on another pile being formed. Alternatively, such large wood-wastes may be transported to a screen apparatus and processed as previously described in reference to the prior invention. As a further alternative, once the large wood-wastes have been removed from the area desired to be covered by the separated-out wood-wastes utilized as groundcover, a new supply of wood-wastes may be dumped on the same area which already contains some depth of the separated-out wood-waste product. The new supply can them be allowed to degrade and large wood pieces separated out again so as to build up the depth of such separated-out wood-waste product as the desired groundcover. Thus, the present invention provides a very practical method for forming groundcover in-situ on landfills, surface mines and the like.

Figure 7:
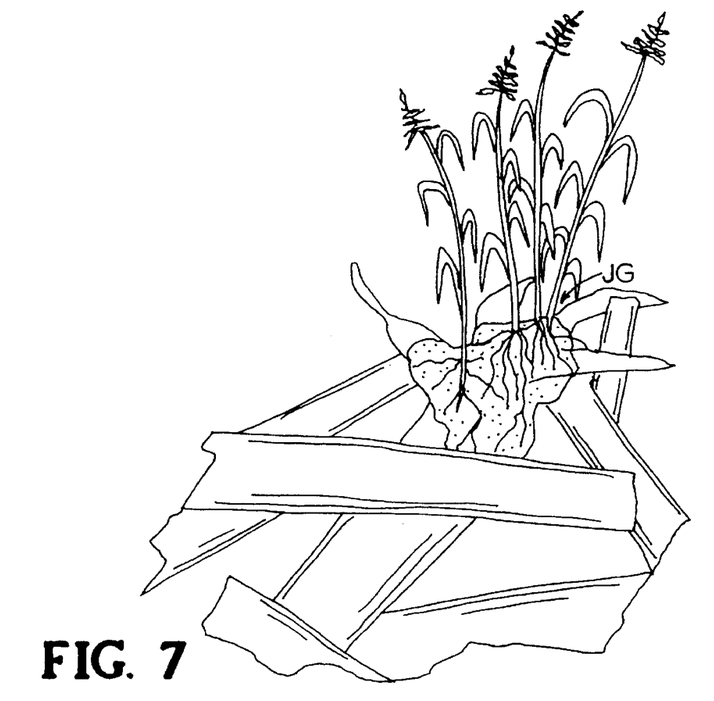
FIG. 7 is a side view illustrating growth of deep-rooted plants on top of a mound.
Figure 8:
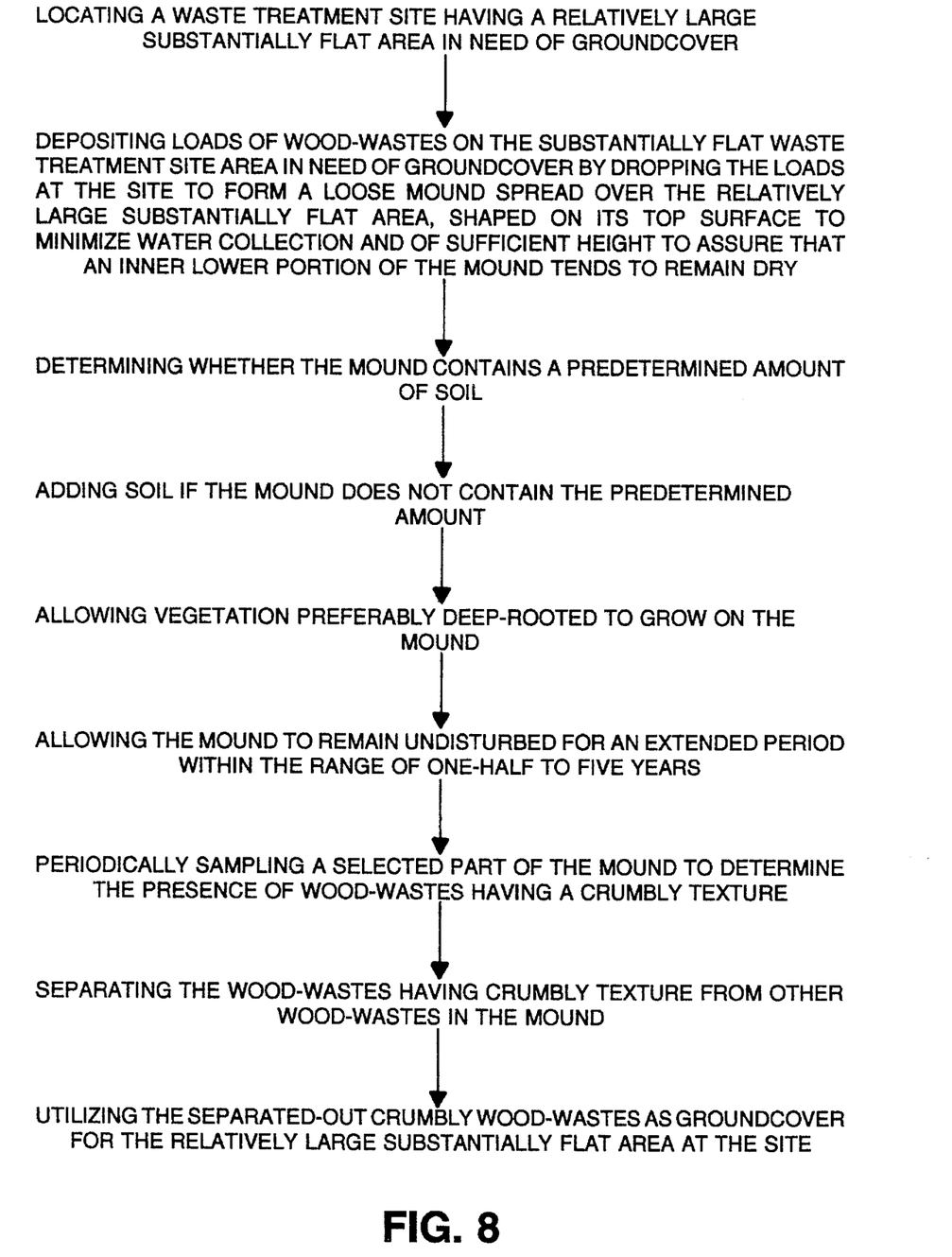
FIG. 8 is a schematic diagram of the improved method of the present invention.

In a final aspect of the present invention illustrated in FIG. 7, it has been discovered that deep-rooted plants such as the so-called and well known Johnson grass JG, when planted on top of a pile P of wood-wastes formed in the manner described, substantially enhances removal of moisture from the pile and thus enhances the dryness of the inner lower portion of the pile. Thus, in the method of the prior invention and in any of the methods of the present invention, the planting of deep-rooted plants on the top of piles during the course of degradation enhances such process in a very beneficial way.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A dry method operable in ambient temperature for disintegrating relatively large, unbroken, unground wood-wastes such as stumps, limbs, branches, tree trunks and whole trees and forming a wood-waste product therefrom suitable as groundcover over areas such as filled landfills, surface mines and the like, comprising:

(a) providing unbroken, unground wood-wastes having at least some associated soil;

(b) providing a waste-treatment site at a relatively flat location in an area where it is desired to establish a groundcover;

(c) depositing loads of said unbroken, unground wood-wastes on said waste-treatment site by dropping the loads including any soil associated therewith at the site to loosely pile said wood-wastes and form an uncovered mound of sufficient height to permit a lower internal portion of said mound to remain substantially dry in the presence of rainfall at the site and shaped to facilitate vegetation growth and avoid rainfall water collection thereon;

(d) enhancing the said dry method of disintegrating by allowing vegetation growth to permeate the uncovered surface of the mound to form a vegetation mass thereon;

(e) insuring that said unbroken, unground wood-wastes within said mound remain undisturbed and unturned for a period within a range of six months to five years without artificial aeration, without the addition of heat, without chemical treatment, in a condition which does not generate heat within the mound and without movement or breaking of the wood-wastes forming the mound until portions of the wood-wastes in the mound are of a desired dry and crumbly texture;

periodically sampling wood-wastes in the mound located over an area at which groundcover is desired to determine when portions of wood in the wood-wastes in the mound at such location are of a desired dry and crumbly texture;

(g) when a desired dry and crumbly texture is determined to be present at such location separating the waste in said mound at such location to form a collection of large unbroken pieces and a collection of granular material forming a non-composted wood-waste product containing dry wood particles and soil particles making up at least a portion of said wood-waste product; and (h) utilizing said non-composted wood-waste product on the area at said location as groundcover.

2. The dry method for disintegrating relatively large, unbroken, unground wood-wastes according to claim 1, further comprising recycling said collection of large unbroken pieces by placing them in a mound at the same or a different location according to step (c) and thereafter repeating said steps (d) through (h).

3. The dry method for disintegrating relatively large, unbroken unground wood wastes according to claim 1, wherein said separating is performed in-situ by a root rake.

4. The dry method for disintegrating relatively large, unbroken unground wood wastes according to claim 1, wherein said vegetation growth includes at least some deep-rooted plants.

5. A dry method operable in ambient temperature for disintegrating relatively large, unbroken, unground wood-wastes such as stumps, limbs, branches, tree trunks and whole trees and which operates in ambient temperature comprising the steps:

(a) providing unbroken, unground wood-wastes having at least some associated soil;

(b) providing a substantially flat waste-treatment site;

(c) depositing loads of said unbroken, unground wood-wastes on said waste-treatment site by dropping the loads including any soil associated therewith at the site to loosely pile said wood-wastes and form an uncovered mound of sufficient height to permit a lower internal portion of said mound to remain substantially dry in the presence of rainfall at the site and shaped to facilitate vegetation growth and avoid rainfall water collection thereon;

(d) enhancing the said dry method of disintegrating by allowing vegetation growth including at least some deep-rooted plants to permeate the uncovered surface of the mound to form a vegetation mass thereon;

(e) insuring that said unbroken, unground wood-wastes within said mound remain undisturbed and unturned for a period within a range of six months to five years without artificial aeration, without the addition of heat, without chemical treatment, in a condition which does not generate heat within the mound and without movement or breaking of the wood-wastes forming the mound until portions of the wood-wastes in the mound are of a desired dry and crumbly texture;

(f) periodically sampling the wood-wastes in the mound to determine when portions of wood in the wood-wastes in the mound are of a desired dry and crumbly texture;

(g) when a desired dry and crumbly texture is determined to be present, separating the waste in said mound to form a collection of large unbroken oversize pieces and a collection of granular material forming a non-composted wood-waste product containing dry wood particles and soil particles making up at least a portion of said wood-waste product; and (h) utilizing said non-composted wood-waste product as groundcover at the said site.

6. The dry method for disintegrating relatively large, unbroken unground wood wastes according to claim 5, wherein said vegetation growth includes at least some deep-rooted plants.

* * * * *